US009288586B2

(12) United States Patent
Polinske et al.

(10) Patent No.: US 9,288,586 B2
(45) Date of Patent: Mar. 15, 2016

(54) METHOD AND APPARATUS FOR SIGNAL RECEPTION USING DYNAMICALLY SELECTABLE MODES

(71) Applicant: Starkey Laboratories, Inc., Eden Prairie, MN (US)

(72) Inventors: Beau Jay Polinske, Minneaplois, MN (US); Jeffrey Paul Solum, Shorewood, MN (US); Stephen Paul Flood, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 416 days.

(21) Appl. No.: 13/725,626

(22) Filed: Dec. 21, 2012

(65) Prior Publication Data

US 2014/0177855 A1 Jun. 26, 2014

(51) Int. Cl.
*H04R 25/00* (2006.01)
*H04B 1/28* (2006.01)
*H04B 1/30* (2006.01)

(52) U.S. Cl.
CPC .................. *H04R 25/30* (2013.01); *H04B 1/28* (2013.01); *H04B 1/30* (2013.01); *H04R 25/00* (2013.01); *H04R 25/554* (2013.01); *H04R 25/305* (2013.01); *H04R 25/552* (2013.01); *H04R 2225/61* (2013.01)

(58) Field of Classification Search
CPC ...... H04R 25/00; H04R 25/30; H04R 25/554; H04R 25/505; H04R 5/033; H04R 25/305; H04R 25/552; H04R 2225/61; H04B 1/28; H04B 1/30; H04B 7/0837; H04W 52/42; H04W 56/0035; H04S 1/007
USPC .............. 381/60, 315, 58, 370, 312; 375/259, 375/227; 455/404.1, 63.1, 553.1, 160.1, 455/67.13, 226.3
See application file for complete search history.

(56) References Cited

U.S. PATENT DOCUMENTS 5,068,729 A * 11/1991 Katznelson et al. ..... 375/240.25
5,253,298 A * 10/1993 Parker et al. .................... 381/13
5,603,088 A * 2/1997 Gorday et al. ............ 455/67.13
5,692,130 A * 11/1997 Shobu et al. ................. 709/229
2003/0222725 A1* 12/2003 Ammar et al. ............... 331/100
2004/0149491 A1* 8/2004 Fling et al. ...................... 175/45
2007/0217637 A1* 9/2007 Haenggi et al. ............... 381/315
2007/0269065 A1* 11/2007 Kilsgaard .................... 381/315
2009/0312820 A1* 12/2009 Nie et al. ........................ 607/57
2012/0002830 A1* 1/2012 Solum .......................... 381/315
2012/0155563 A1* 6/2012 Munro et al. ................ 375/268
2014/0072022 A1* 3/2014 Medles et al. ............... 375/227

* cited by examiner

*Primary Examiner* — Vivian Chin
*Assistant Examiner* — Ubachukwu Odunukwe
(74) *Attorney, Agent, or Firm* — Schwegman Lundberg & Woessner, P.A.

(57) ABSTRACT

A communication system reduces power consumption of a radio receiver and/or ensures quality of signal transmission by using various modes of receiver operation. In one embodiment, the communication system is part of a hearing assistance system with a hearing aid including the radio receiver. In one embodiment, a mode of reception is selected during signal transmission based on a detected parameter indicative of quality of the signal transmission. In one embodiment, a hearing aid includes a radio receiver using independent sidebands to receive signals transmitted using each of an upper-sideband and a lower-sideband.

20 Claims, 6 Drawing Sheets

722
RECEPTION CIRCUIT
740
DEMODULATORS
344
DSB DEMODULATOR
SSB DEMODULATOR
346
MODE SWITCH
742
PERFORMANCE ANALYZER
714
COMPARATOR
750

METHOD AND APPARATUS FOR SIGNAL RECEPTION USING DYNAMICALLY SELECTABLE MODES

TECHNICAL FIELD

This document relates generally to communication systems and more particularly to method and apparatus for reducing power consumption and/or ensuring quality of radio signal transmission using various modes of reception.

BACKGROUND

Superheterodyne receiver (superhet) has been used in radio communication. A superheterodyne receiver has a local oscillator (LO) that is mixed with the incoming received signal to generate a lower frequency signal commonly referred to as the intermediate frequency (IF). The superhet can have the LO lower in frequency than the received signal. In this case, the received signal represents an Upper Sideband (USB) response. Similarly, the local oscillator can be higher in frequency than the received signal. In this case the received signal is referenced as the Lower Sideband (LSB) response. A receiver without image rejection is referenced as a Double Sideband (DSB) receiver, which has the LSB and USB signals both translated to the IF frequency.

One or more hearing instruments may be worn on a person's head to deliver sounds to the person's ears. Radio technology may be applied for a hearing instrument to communicate with another device such as another hearing instrument or a host device. An example of hearing instruments includes a hearing aid used to assist a patient suffering hearing loss by transmitting amplified sounds to an ear canal. The hearing aid is worn in and/or around one of the patient's ears, and may be powered by a battery. In many cases, the patient prefers the hearing aid to be small and minimally visible. This limits the battery size and hence the energy available for the operation of the hearing aid. Thus, there is a need for minimizing power consumption of the hearing aid while ensuring satisfactory performance of its various operations.

SUMMARY

A communication system reduces power consumption of a radio receiver and/or ensures quality of signal transmission by using various modes of receiver operation. In one embodiment, the communication system is part of a hearing assistance system with a hearing aid including the radio receiver. In one embodiment, a mode of reception is selected during signal transmission based on a detected parameter indicative of quality of the signal transmission. In one embodiment, a hearing aid includes a radio receiver using independent sidebands to receive signals transmitted using each of an upper-sideband and a lower-sideband.

In one embodiment, a system for signal transmission to a hearing assistance device includes a plurality of demodulators, a performance analyzer, and a mode switch. The plurality of demodulators is configured to demodulate a signal transmitted using one or both of an upper sideband (USB) and a lower sideband (LSB), and includes a double-sideband (DSB) demodulator configured to demodulate the signal transmitted using DSB and a single-sideband (SSB) demodulator configured to demodulate the signal transmitted using SSB. The performance analyzer is configured to detect a performance parameter being a measure of quality of the signal transmission. The mode switch is configured to select a demodulator from the plurality of demodulators using the detected performance parameter.

In one embodiment, a method for signal transmission to a hearing assistance device is provided. A hearing aid is provided with a radio receiver capable of receiving a signal transmitted using one or both of an USB and an LSB. The radio receiver is configured to operate in a reception mode selected from a plurality of reception modes including a DSB mode to receive the signal transmitted using both the USB and the LSB and an SSB mode to receive the signal transmitted using the USB or the LSB. A performance parameter being a measure of quality of the signal transmission is detected. A reception mode is selected from the plurality of reception modes using the detected performance parameter.

In one embodiment, another method for signal transmission to a hearing assistance device is provided. A hearing aid is provided with an independent-sideband (ISB) demodulator. First and second signals are received. The first signal is transmitted using an USB. The second signal IS transmitted using an LSB. The first and second signals are demodulated using the ISB demodulator. Data carried in the first and second signals are recovered for use by the hearing aid.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

This document discusses a communication system that reduces power consumption of a radio receiver and/or ensures quality of signal transmission by using various modes of reception of desired signals. Each of the modes of reception is associated with a power consumption of the radio receiver and a measure of quality of the signal transmission. In various embodiments, the present system dynamically selects one of available modes of reception for operating the radio receiver based on balancing between the power consumption and the measure of signal transmission quality. In one embodiment, the present system includes a multi-mode receiver that is capable of both double sideband (DSB) reception and single sideband (SSB) reception. Application of the present system includes, for example, hearing assistance systems in which minimization of power consumption is desirable for a battery-powered hearing instrument. One example of such battery-powered hearing instrument includes a hearing aid that includes a radio receiver for communication with a hearing aid host device. The present system provides a hearing aid with increased battery replacement/recharge cycle while maintaining an acceptable or desirable level of audio communication performance. In various embodiments, the present system allows for a tradeoff of data transmission performance and power consumption while the data transmission is ongoing. In various embodiments, the present system is capable of independent sideband (ISB) reception and uses both sidebands to transmit signals independently, thereby ensuring signal transmission quality, such as by providing means for cross-checking using redundant signals transmitted using the independent sidebands.

Figure 1:
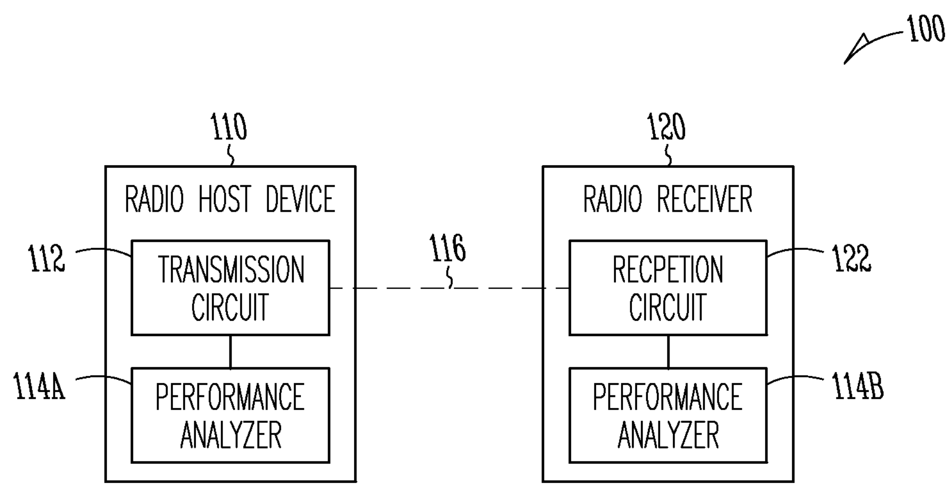
FIG. 1 is a block diagram illustrating an embodiment of a radio system including various reception modes for signal transmission.

FIG. 1 is a block diagram illustrating an embodiment of a radio system 100, which includes one or more reception modes for signal transmission. System 100 includes a radio host device 110 and a radio receiver 120 communicatively coupled via a wireless link 116. In various embodiments, radio host device 110 and radio receiver 120 may each be part of a radio transceiver device that transmit and receives radio signals.

Radio receiver 120 includes a reception circuit 122 that is configured to receive one or more signals transmitted using an upper sideband (USB) and/or a lower sideband (LSB). In various embodiments, reception circuit 122 is capable of operating in one or more reception modes. Examples of such one or more reception modes include DSB mode for receiving a signal transmitted using DSB (both the USB and the LSB) and/or SSB (either the USB or the LSB), SSB mode for receiving a signal transmitted using SSB (either the USB or the LSB), and independent-sideband (ISB) mode for receiving first and second signals transmitted using ISB (one of the first and second signals transmitted using the USB, the other transmitted using the LSB). The SSB mode may further include a USB mode for receiving a signal transmitted using the USB and an LSB mode for receiving a signal transmitted using the LSB. Reception circuit 122 includes one or more demodulators allowing radio receiver 120 to operate in the corresponding one or more reception modes.

Radio host device 110 includes a transmission circuit 112 to transmit the one or more signals according to the reception mode under which reception circuit 122 is operating. In various embodiments, a reception mode is selected for receiving the one or more signals based on a detected measure of quality of signals received over a wireless link 116. A performance analyzer 114 measures one or more performance parameters each being a measure of quality of the signal transmission. Examples of the one or more performance parameters include a signal-to-noise ratio associated with the signal transmission, a parameter indicating presence of interference in one or both of the USB and the LSB, and an error rate in the signal transmission such as a bit error rate (BER), packet error rate (PER), or dropped connections in digital data transmission. One or more other performance parameters may also be used as desired.

In the illustrated embodiment, performance analyzer 114 includes a first portion (performance analyzer 114A) residing in radio host device 110 and a second portion (performance analyzer 114B) residing in radio receiver 120. Performance analyzers 114A and 114B (i.e., the two portions of performance analyzer 114) communicates through wireless link 116. In various embodiments, performance analyzer 114 may also be entirely included in radio host device 110 and communicates to reception circuit 122 via wireless link 116, or entirely included in radio receiver 120.

Figure 2:
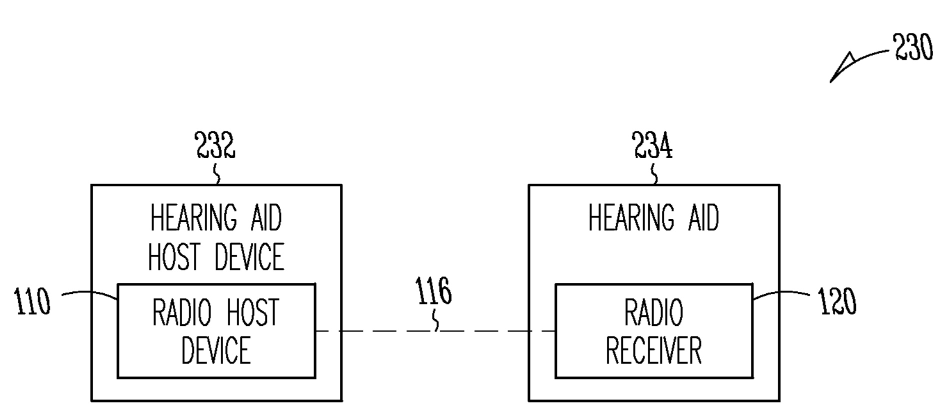
FIG. 2 is a block diagram illustrating an embodiment of a hearing assistance system including the radio system.

FIG. 2 is a block diagram illustrating an embodiment of a hearing assistance system 230, which includes radio system 100. System 230 includes a hearing aid host device 232 and a hearing aid 234. Hearing aid host device 232 includes radio host device 110. Hearing aid 234 includes radio receiver 120. While one pair of hearing aid host device and hearing aid is shown in FIG. 2 for illustrative purposes, system 230 may include one or more hearing aid host devices and one or more hearing aids in various embodiments. For example, hearing aid host device 232 may communicate with a pair of hearing aids 234 for use in both ears of a patient. The hearing aids may each include radio receiver 120. In various embodiments, radio host device 110 may include a transceiver, and hearing aid 234 may include another transceiver that includes radio receiver 120.

In various embodiments, hearing aid 234 is battery powered, and it is desirable to minimize its power consumption, thereby maximizing its battery life or recharge cycle. In one embodiment, hearing aid host device 232, to which more energy is available, includes all or most of performance analyzer 114. In another embodiment, hearing aid 234 includes all or most of performance analyzer 114 by utilizing low-power circuit technology. In another embodiment, host device 232 may be a hearing aid. In other words, the hearing aid may include radio host device 110.

Figure 3:
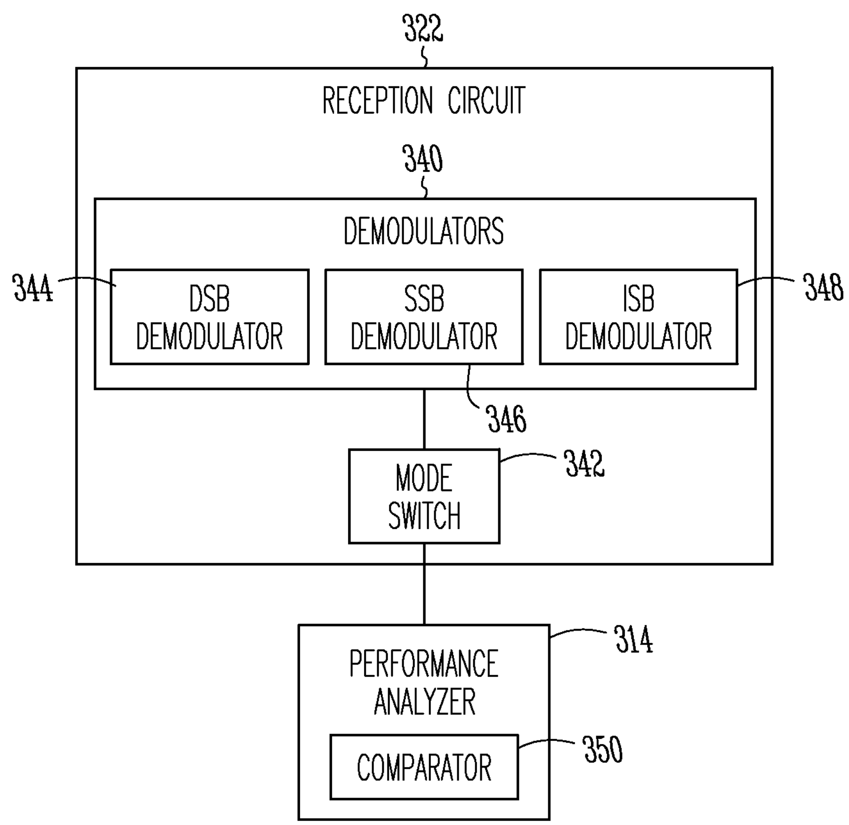
FIG. 3 is a block diagram illustrating an embodiment of a reception circuit and a performance analyzer of the radio system.

FIG. 3 is a block diagram illustrating an embodiment of a reception circuit 322 and a performance analyzer 314. Reception circuit 322 represents an embodiment of reception circuit 122 and includes one or more demodulators 340 and a mode switch 342. Performance analyzer 314 represents an embodiment of performance analyzer 114 and includes a comparator 350. In various embodiments, reception circuit 322 may be part of radio receiver 120, and performance analyzer 314 may be distributed in both radio host device 110 and radio receiver 120, entirely included in radio host device 110 and communicates to reception circuit 122 via wireless link 116, or entirely included in radio receiver 120.

In the illustrated embodiment, demodulators 340 include a DSB demodulator 344, an SSB demodulator 346, and an ISB demodulator 348. In various embodiments, demodulator(s) 340 include(s) DSB demodulator 344, SSB demodulator 346, ISB demodulator 348, or a combination of any two or three of DSB demodulator 344, SSB demodulator 346, and ISB demodulator 348. In various embodiments, demodulators 340 may include a single demodulator circuit that can be configured or switched to various configurations such as DSB demodulator 344, SSB demodulator 346, ISB demodulator 348, or a combination of any two or three of DSB demodulator 344, SSB demodulator 346, and ISB demodulator 348. In other words, demodulators 340 may include a single demodulator circuit that can be configured to operate in DSB, SSB, and/or ISB modes.

DSB demodulator 344 demodulates the signal transmitted using DSB (both the USB and the LSB). One example of DSB demodulator 344 includes an envelope detector. SSB demodulator 346 demodulates the signal transmitted using SSB (the USB or the LSB, but not both). Examples of DSB demodulator 344 and SSB demodulator 346 are discussed below with references to FIGS. 4, 5, and 6. ISB demodulator 348 demodulates the first and second signals transmitted using ISB (one of the first and second signals transmitted using the USB; the other transmitted using the LSB). ISB demodulator 348 may include SSB demodulators configured as a USB demodulator that demodulates the signal transmitted using USB and an LSB demodulator that demodulates the signal transmitted using LSB.

Mode switch 342 is used when demodulators 340 include a plurality of demodulators with one of the demodulators being selected to be active at a time. Performance analyzer 314 detects the one or more performance parameters each being the measure of quality of the signal transmission. Mode switch 342 selects a demodulator from the plurality of demodulators 340 using the one or more performance parameters. In one embodiment, radio receiver 120 is a dual-mode receiver with its reception circuit 322 including DSB demodulator 344 and SSB demodulator 346. Mode switch 342 selects between the DSB and SSB modes. In one embodiment, radio receiver 120 is an ISB receiver with its reception circuit 322 including only ISB demodulator 348. Mode switch 342 is not needed.

In one embodiment, comparator 350 compares the detected one or more performance parameters to one or more specified performance thresholds. Mode switch 342 selects the demodulator using an outcome of the comparison. For example, the one or more specified performance thresholds represent a minimum requirement on the quality of the signal transmission. Once this minimum requirement is met, mode switch 342 selects the demodulator that has the lowest power consumption among all the demodulators of demodulators 340.

Figure 4:
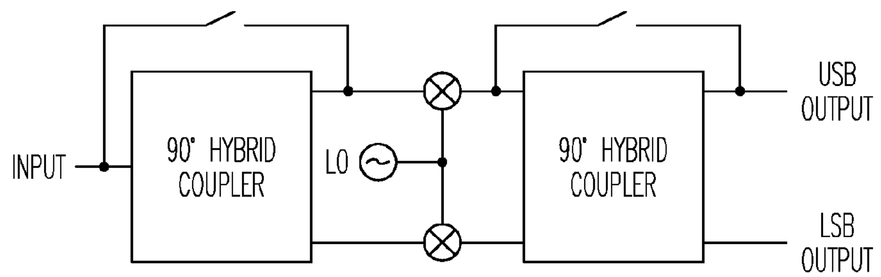
FIG. 4 is a circuit schematic illustrating an embodiment of a double-sideband (DSB)/single-sideband (SSB)/independent-sideband (ISB) demodulator.
Figure 5:
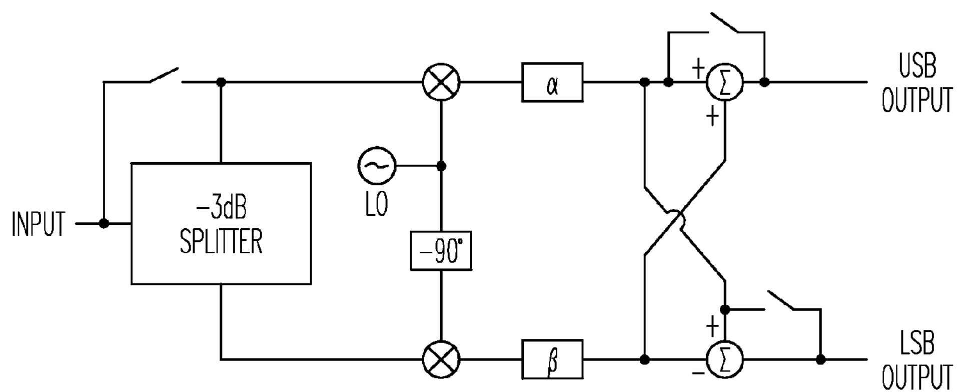
FIG. 5 is a circuit schematic illustrating an embodiment of another DSB/SSB/ISB demodulator.
Figure 6:
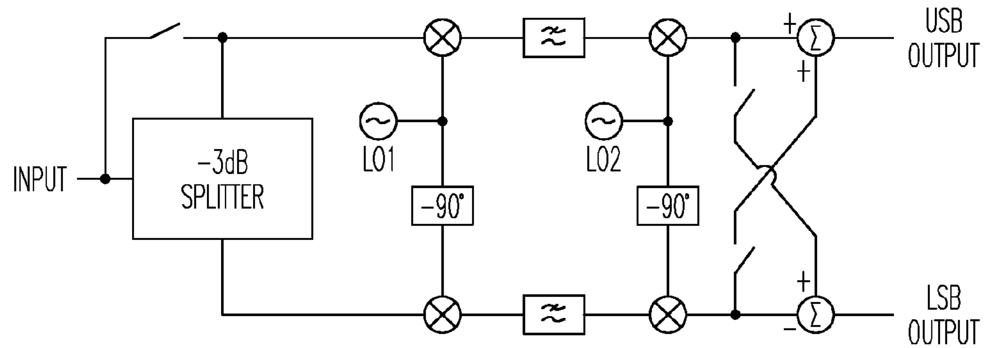
FIG. 6 is a circuit schematic illustrating an embodiment of another DSB/SSB/ISB demodulator.

FIGS. 4-6 are circuit schematics illustrating various embodiments of demodulators each including one or more switches allowing the circuit to be switched for DSB demodulation, SSB demodulation, or ISB demodulation. These embodiments are illustrated by way of example, and not by way of limitation, of DSB demodulator 344, SSB demodulator 346, and ISB demodulator 348.

FIG. 4 is a circuit schematic illustrating an embodiment of a DSB/SSB/ISB demodulator that performs a phase-shift method for SSB demodulation. FIG. 5 is a circuit schematic illustrating an embodiment of another DSB/SSB/ISB demodulator that performs the phase-shift method of SSB demodulation. The demodulation is accomplished by frequency conversion to a low-frequency intermediate frequency (IF) or by direct conversion using an two mixers with a local oscillator (LO) and a phase shifted version of the LO by 90 degrees followed by phase shifting each mixer output to maintain a 90-degree phase shift between the In-phase and Quadrature (IQ) components followed by summation or subtraction to produce the USB or the LSB signal.

FIG. 6 is a circuit schematic illustrating an embodiment of a DSB/SSB/ISB demodulator being a Weaver demodulator performing the Weaver method of SSB demodulation. The Weaver method uses four mixers with two LO's phase shifted from each other. This method avoids maintaining phase shifting of what could be broadband signals to accomplish similar discrimination of USB and LSB similar to the phase-shift method. One technique for producing a phase shifted version of the LO includes running the LO and 2 or 4 times the LO frequency to create the quadrature version of the LO. This technique is considered power consumptive and is usually implemented with two or more RF mixers each running in quadrature.

Each of the filter, phase-shift, and Weaver demodulators for SSB reception consumes more power than a single conversion DSB demodulator. On the other hand, the SSB mode of reception has several advantages over the DSB mode of reception. The SSB mode may be associated with an overall noise figure that is lower than that of the DSB mode with similar bandwidth by about 3 dB, owing to the reduced noise presence at the demodulator from the unused sideband. The SSB mode has better selectivity and performs better when an unwanted signal is present in the unused sideband. The SSB demodulator rejects interference in the unused sideband, thereby improving performance of signal reception. The present system and method as discussed in this document balance the performance of signal transmission and the power consumption of the radio receiver by utilizing the advantages of both the DSB mode (lower power consumption) and the SSB mode (better performance of signal transmission).

Figure 7:
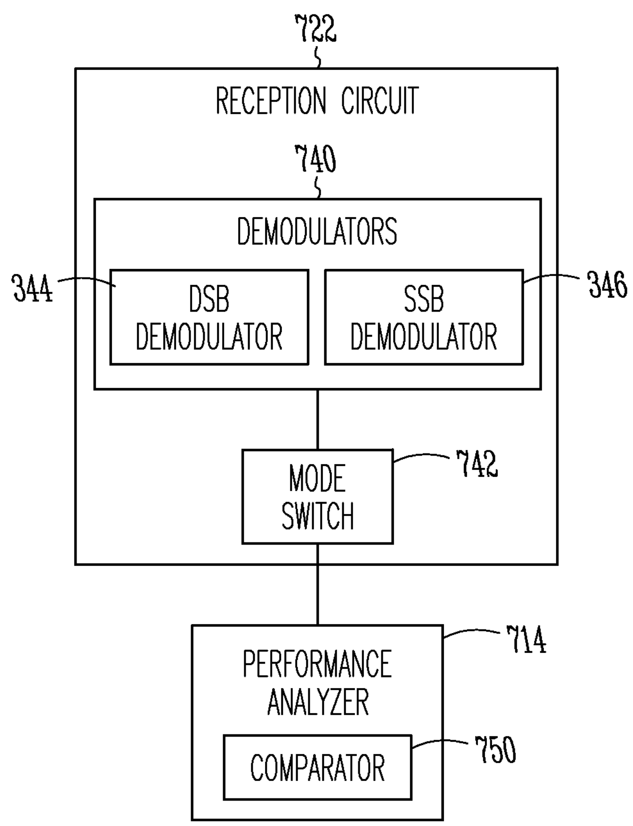
FIG. 7 is a block diagram illustrating an embodiment of a dual-mode reception circuit capable of double-sideband (DSB) reception and SSB reception and a performance analyzer of the radio system.

FIG. 7 is a block diagram illustrating an embodiment of a dual-mode reception circuit 722 and a performance analyzer 714. Dual-mode reception circuit 722 represents an embodiment of reception circuit 322 and includes a plurality of demodulators 740 to demodulate a signal transmitted using one or both of the USB and the LSB and a mode switch 742 to select a mode of reception from the DSB and SSB modes. The plurality of demodulators 740 includes DSB demodulator 344 and SSB demodulator 346. Performance analyzer 714 represents an embodiment of performance analyzer 322 and detects a performance parameter being a measure of quality of the signal transmission. Mode switch 742 selects a demodulator from the plurality of demodulators 740 using the detected performance parameter. In the illustrated embodiment, performance analyzer 714 includes a comparator 750, which represents an embodiment of comparator 350. In various embodiments, reception circuit 722 may be part of radio receiver 120, and performance analyzer 714 may be distributed in both radio host device 110 and radio receiver 120, entirely included in radio host device 110 and communicates to reception circuit 122 via wireless link 116, or entirely included in radio receiver 120.

A single conversion radio can support the DSB mode of reception using substantially less power than the SSB mode of reception. However, the DSB mode is associated with a relatively poor noise figure due to the presence of sideband noise and interference. Dual-mode reception circuit 722 allows for trading off power consumption with performance of the signal transmission (low noise figure and high selectivity).

In one embodiment, the DSB mode is selected as long as a signal-to-noise ratio (SNR) associated with the signal transmission remains sufficiently high. In response to the SNR failing to remain sufficiently high, the reception mode is switched to the SSB mode to improve the SNR at the expense of additional power consumption. In an example, performance analyzer detects a DSB performance parameter being the measure of quality of the signal transmission associated with the DSB mode (i.e., detected when DSB demodulator 344 is selected). An example of the performance parameter is the SNR associated with the signal transmission. Comparator 750 compares the detected DSB performance parameter to a specified performance threshold. Mode switch 742 selects SSB demodulator 346 in response to the detected DSB performance parameter falling below the specified performance threshold. In one embodiment, when SSB demodulator 346 is selected and operating, mode switch 742 selects DSB demodulator 344 for detecting the DSB performance parameter. If the DSB performance parameter reaches or exceeds the specified performance threshold, mode switch 742 selects DSB demodulator 344. If the DSB performance parameter is below the specified performance threshold, mode switch 742 re-selects SSB demodulator 346.

In another embodiment, both of the USB and the LSB may be interrogated to determine whether an unwanted signal is present in the unused sideband. The reception mode may switch from the SSB mode to the DSB mode to reduce the power consumption required for the signal transmission when interference is not detected in the unused side band. In an example, performance analyzer 714 detects a USB performance parameter being the measure of quality of the signal transmission associated with the USB and an LSB performance parameter being the measure of quality of the signal transmission associated with the LSB. An example of each of the USB and LSB performance parameters includes parameters indicating detection of interference in the USB and the LSB, respectively. Comparator 714 compares each of the detected USB performance parameter and the detected LSB parameter to a specified performance threshold (e.g., the threshold being no detected interference). Mode switch 742 selects DSB demodulator 344 in response to the detected USB performance parameter and the detected LSB performance parameter each reaching or exceeding the specified performance threshold (e.g., the performance parameters indicating no interference in the USB and the LSB being detected). In another example, performance analyzer 714 detects an unused sideband performance parameter including the measure of quality of the signal transmission associated with the unused sideband of the USB and the LSB during the SSB mode of reception. An example of the unused sideband performance parameter includes a parameter indicating detection of interference in the unused sideband. Comparator 750 compares each of the detected unused sideband performance parameter to a specified performance threshold (e.g., the threshold being no detected interference). Mode switch 742 selects DSB demodulator 344 in response to the detected unused performance parameter exceeding the specified performance threshold (e.g., the performance parameter indicating no interference in the unused sideband being detected). In this independent sideband mode of transmission, it is possible to separate the sidebands substantially from one another to add frequency diversity to the transmission, further avoiding potential interference and improving the reception in the face of frequency selective fading due to multipath signal arrivals. For example, the sidebands can be substantially separated by selecting a higher IF frequency.

Figure 8:
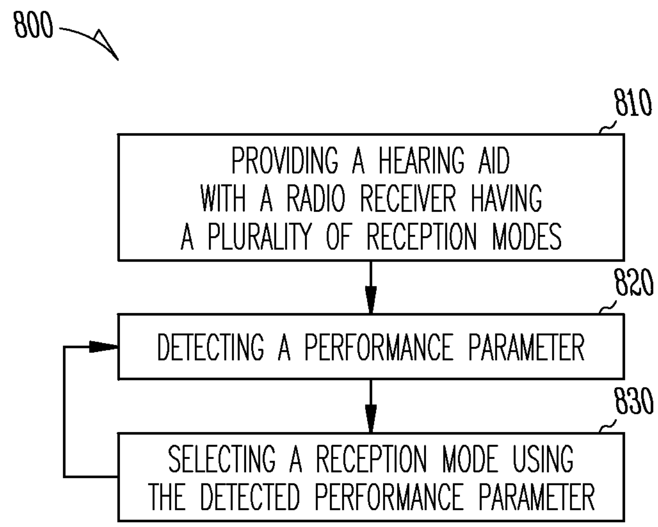
FIG. 8 is a flow chart illustrating an embodiment of a method for signal transmission with dynamic selection between DSB and SSB reception modes.

FIG. 8 is a flow chart illustrating an embodiment of a method 800 for signal transmission with dynamic selection between DSB and SSB reception modes. The selection is dynamic in the sense that it is performed "on the fly", such as during a data transmission session. In one embodiment, method 800 is performed using reception circuit 722 and performance analyzer 714. In one embodiment, method 800 is performed for signal transmission to a hearing assistance device such as a hearing aid.

At 810, a radio receiver is provided to the hearing assistance device. The radio receiver is capable of receiving signals transmitted using one or both of the USB and the LSB. The radio receiver is configured to operate in a reception mode selected from a plurality of reception modes including the DSB mode to receive the signal transmitted using both the USB and the LSB and the SSB mode to receive the signal transmitted using the USB or the LSB. In various embodiments, the radio receiver is part of a radio transceiver that is provided to the hearing assistance device. The radio transceiver is capable of sending and or receiving signals transmitted or received using one or both of the USB and the LSB. The radio transceiver is configured to operate in a transmission or reception mode selected from a plurality of modes including the DSB mode and the SSB mode.

At 820, a performance parameter is detected. The performance parameter is a measure of quality of the signal transmission. Examples of the performance parameter include an SNR associated with the signal transmission, a parameter indicating detection of interference in one or both of the USB and the LSB, and an error rate in the signal transmission when digital data is transmitted. In one embodiment, the performance parameter is detected by the hearing assistance device. In another embodiment, the performance parameter is detected by a host device communicatively coupled to the hearing assistance device.

At 830, a reception mode is selected from the plurality of reception modes using the detected performance parameter. In one embodiment, the detected performance parameter is compared to one or more specified performance thresholds, and the reception mode is selected using an outcome of the comparison. In one embodiment, a DSB performance parameter is detected. The DSB performance parameter is the measure of quality of the signal transmission associated with the DSB mode. The detected DSB performance parameter is compared to a specified performance threshold. The SSB mode is selected in response to the detected performance parameter falling below the specified performance threshold. In another embodiment, a USB performance parameter and an LSB performance parameter are detected. The USB performance parameter is the measure of quality of the signal transmission associated with the USB. The LSB performance parameter is the measure of quality of the signal transmission associated with the LSB. Each of the detected USB performance parameter and the detected LSB parameter is compared to a specified performance threshold. The DSB mode is selected in response to the detected USB performance parameter and the detected LSB performance parameter each reaching or exceeding the specified performance threshold. In another embodiment, an unused sideband performance parameter is detected. The unused sideband performance parameter is the measure of quality of the signal transmission associated the unused sideband of the USB and the SSB when the SSB mode is selected. The detected unused sideband performance parameter is compared to a specified performance threshold. The DSB mode is selected in response to the detected unused performance parameter reaching or exceeding the specified performance threshold.

Figure 9:
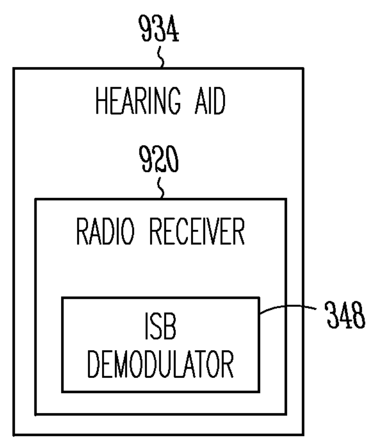
FIG. 9 is a block diagram illustrating an embodiment of a hearing aid including an independent sideband (ISB) radio receiver.

FIG. 9 is a block diagram illustrating an embodiment of a hearing aid 934 including a radio receiver 920 that receives signals transmitted using ISB. Hearing aid 934 represents an embodiment of hearing aid 234. Radio receiver 920 represents an embodiment of radio receiver 120 and includes ISB demodulator 348. ISB demodulator 348 demodulates a first signal transmitted using the USB and second signal transmitted using the LSB. In various embodiments, using the ISB mode of reception allows for redundant data transmission to improve communication accuracy or increase of effective bandwidth for the signal transmission by using the USB and the LSB for different signal transmission purposes.

Figure 10:
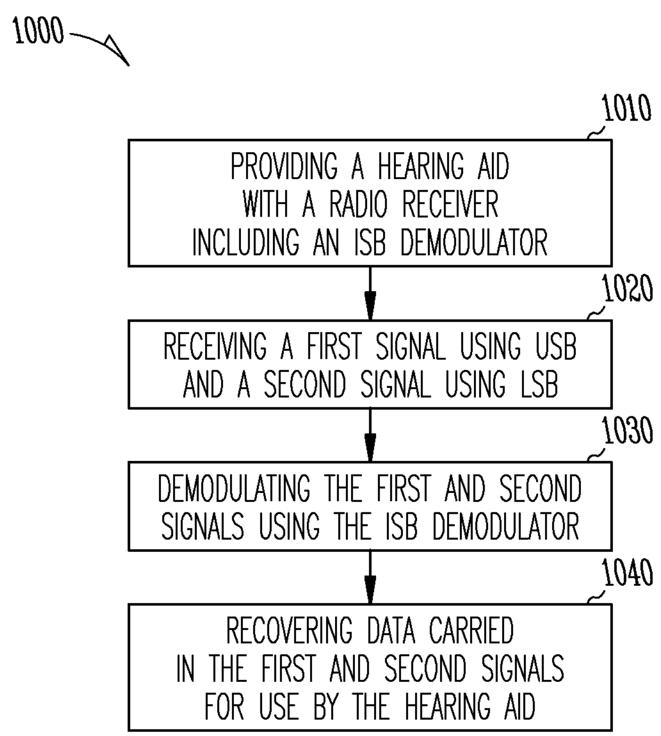
FIG. 10 is a flow chart illustrating an embodiment of a method for signal transmission to the hearing aid using ISB reception.

FIG. 10 is a flow chart illustrating an embodiment of a method 1000 for signal transmission to the hearing aid using ISB reception. In one embodiment, method 1000 is performed by radio receiver 920 for the signal transmission to hearing aid 934.

At 1010, a hearing aid is provided with a radio receiver with an ISB demodulator for receiving signals. At 1020, a first signal transmitted using the USB and a second signal transmitted using the LSB are received. The first and second signals each carry data to be received by the hearing aid. At 1030, the first and second signals are demodulated using the ISB demodulator. At 1040, the data carried in the first and second signals are recovered for use by the hearing aid.

In one embodiment, the first and the second signals carry identical data to improve the probability of reception. The data are recovered, for example, using a maximum-likelihood estimation technique. The technique can include signal combining prior to demodulation, or post demodulation, to combine the information received so as to attain a better error rate such as measured by the BER. If the USB and the LSB are sufficiently separated in frequency, these sidebands can act as a diversity channel in the face of impairments such as multipath fading in a wireless communication channel.

In another embodiment, the first and second signals are different signals carrying substantially different data. This allows for increase of speed of the signal transmission (data transmission rate) by providing twice the available bandwidth for the signal transmission.

In another embodiment, one of the first and second signals carries analog data, while the other of the first and second signals carries digital data. This allows for transmission of both analog and digital data to the hearing aid using one ISB demodulator.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing aid, comprising:
- a plurality of demodulators configured to demodulate a signal transmitted to the hearing aid using one or both of an upper sideband (USB) and a lower sideband (LSB), the plurality of demodulators including:
- a double-sideband (DSB) demodulator configured to demodulate the signal transmitted using DSB; and
- a single-sideband (SSB) demodulator configured to demodulate the signal transmitted using SSB; and
- a performance analyzer configured to detect a performance parameter being a measure of quality of the signal transmission, wherein the performance analyzer comprises a comparator configured to compare the detected performance parameter to one or more specified performance thresholds; and
- a mode switch configured to select a demodulator from the plurality of demodulators using an outcome of the comparison and a power consumption associated with each demodulator of the plurality of demodulators.

2. The hearing aid of claim 1, wherein the performance analyzer is configured to detect a DSB performance parameter being the measure of quality of the signal transmission associated with the DSB demodulator, the comparator is configured to compare the detected DSB performance parameter to a specified performance threshold, and the mode switch is configured to select the SSB demodulator in response to the detected DSB performance parameter falling below the specified performance threshold.

3. The hearing aid of claim 2, wherein the performance analyzer is configured to detect a signal-to-noise ratio associated with the signal transmission.

4. The hearing aid of claim 1, wherein the performance analyzer is configured to detect one or both of an upper-sideband (USB) performance parameter and a lower-sideband (LSB) performance parameter, the USB performance parameter being the measure of quality of the signal transmission associated with the SSB demodulator using the USB, the LSB performance parameter being the measure of quality of the signal transmission associated with the SSB demodulator using the LSB.

5. The hearing aid of claim 4, wherein the performance analyzer is configured to detect interference in the signal transmission using each of the USB and the LSB, and the mode switch is configured to select the demodulator from the plurality of demodulators using an outcome of the detection of the interference.

6. The hearing aid of claim 4, wherein the comparator is configured to compare each of the detected USB performance parameter and the detected LSB parameter to a specified performance threshold, and the mode switch is configured to select the DSB demodulator in response to the detected USB performance parameter and the detected LSB performance parameter each reaching or exceeding the specified performance threshold.

7. The hearing aid of claim 4, wherein the performance analyzer is configured to detect interference in an unused sideband of the USB and the LSB when the SSB demodulator is selected, and the mode switch is configured to select the DSB demodulator in response to the interference not being detected in the unused sideband.

8. A method for signal transmission to a hearing assistance device, the method comprising:
- providing a hearing aid with a radio receiver capable of receiving a signal transmitted using one or both of an upper sideband (USB) and a lower sideband (LSB), the radio receiver configured to operate in a reception mode selected from a plurality of reception modes including a double-sideband (DSB) mode to receive the signal transmitted using both the USB and the LSB and a single-sideband (SSB) mode to receive the signal transmitted using the USB or the LSB;
- detecting a performance parameter being a measure of quality of the signal transmission;
- comparing the detected performance parameter to one or more specified performance thresholds;
- and selecting the reception mode from the plurality of reception modes using an outcome of the comparison and a power consumption associated with each reception mode of the plurality of reception modes.

9. The method of claim 8, wherein detecting the performance parameter comprises detecting a signal-to-noise ratio associated with the signal transmission.

10. The method of claim 8, wherein detecting the performance parameter comprises detecting interference in one or both of the USB and the LSB.

11. The method of claim 8, wherein detecting the performance parameter comprises detecting an error rate in the signal transmission.

12. The method of claim 8, wherein detecting the performance parameter comprises detecting the performance parameter using the hearing aid.

13. The method of claim 8, wherein detecting the performance parameter comprises detecting the performance parameter using a hearing aid host device communicatively coupled to the hearing aid to transmit the signal to the hearing aid.

14. The method of claim 8, comprising:

detecting a DSB performance parameter being the measure of quality of the signal transmission associated with the DSB mode;

comparing the detected DSB performance parameter to a specified performance threshold; and selecting the SSB mode in response to the detected performance parameter falling below the specified performance threshold.

15. The method of claim 8, comprising:

detecting a USB performance parameter being the measure of quality of the signal transmission associated with the USB and an LSB performance parameter being the measure of quality of the signal transmission associated with the LSB;

comparing each of the detected USB performance parameter and the detected LSB parameter to a specified performance threshold; and selecting the DSB mode in response to the detected USB performance parameter and the detected LSB performance parameter each reaching or exceeding the specified performance threshold.

16. The method of claim 8, comprising:

detecting an unused sideband performance parameter being the measure of quality of the signal transmission associated the unused sideband of the USB and the LSB when the SSB mode is selected;

comparing the detected unused sideband performance parameter to a specified performance threshold; and selecting the DSB mode in response to the detected unused performance parameter reaching or exceeding the specified performance threshold.

17. A hearing assistance system, comprising:

a hearing aid including:

a plurality of demodulators configured to demodulate a signal transmitted to the hearing aid using one or both of an upper sideband (USB) and a lower sideband (LSB), the plurality of demodulators including:

a double-sideband (DSB) demodulator configured to demodulate the signal transmitted using DSB; and a single-sideband (SSB) demodulator configured to demodulate the signal transmitted using SSB; and a performance analyzer configured to detect a performance parameter being a measure of quality of the signal transmission, wherein the performance analyzer comprises a comparator configured to compare the detected performance parameter to one or more specified performance thresholds; and a mode switch configured to select a demodulator from the plurality of demodulators using an outcome of the comparison and a power consumption associated with each demodulator of the plurality of demodulators; and a hearing aid host device configured to transmit the signal to the hearing aid using the one or both of the USB and LSB based on the selected demodulator.

18. The system of claim 17, wherein the performance analyzer is configured to detect interference in an unused sideband of the USB and the LSB when the SSB demodulator is selected; and the mode switch is configured to select the DSB demodulator in response to the interference not being detected in the unused sideband.

19. The system of claim 18, wherein the performance analyzer is configured to detect a signal-to-noise ratio associated with the signal transmission.

20. The system of claim 17, wherein the performance analyzer is configured to detect one or both of an upper-sideband (USB) performance parameter and a lower-sideband (LSB) performance parameter, the USB performance parameter being the measure of quality of the signal transmission associated with the SSB demodulator using the USB, the LSB performance parameter being the measure of quality of the signal transmission associated with the SSB demodulator using the LSB.

* * * * *